United States Patent [19]

Kussel et al.

[11] Patent Number: 4,682,678
[45] Date of Patent: Jul. 28, 1987

[54] GEARING UNITS FOR USE WITH MINING EQUIPMENT

[75] Inventors: Willy Kussel, Werne; Werner Bohle, Lüdinghausen, both of Fed. Rep. of Germany

[73] Assignee: Gewerkschaft Eisenhutte Westfalia, Lunen, Fed. Rep. of Germany

[21] Appl. No.: 815,307

[22] Filed: Dec. 30, 1985

Related U.S. Application Data

[63] Continuation of Ser. No. 563,487, Dec. 20, 1983, abandoned.

[30] Foreign Application Priority Data

Dec. 24, 1982 [DE] Fed. Rep. of Germany ....... 3248084

[51] Int. Cl.⁴ ..................... F16D 25/063; F16D 43/21
[52] U.S. Cl. .................. 192/56 F; 192/91 A
[58] Field of Search ..................... 192/56 F, 150, 91 A

[56] References Cited

U.S. PATENT DOCUMENTS

| | | | |
|---|---|---|---|
| 2,783,628 | 3/1957 | Hallewell | 192/56 F |
| 2,790,340 | 4/1957 | Cross | 192/150 |
| 2,963,134 | 12/1960 | Banner | 192/56 F |
| 3,298,488 | 1/1967 | McDonald | 192/150 |
| 3,360,087 | 12/1967 | Hilpert | 192/56 F |
| 3,807,539 | 4/1974 | Reed | 192/56 F |
| 3,946,837 | 3/1976 | Houser | 192/91 A |
| 4,077,500 | 3/1978 | Hickman, Sr. et al. | 192/91 A |
| 4,114,747 | 9/1978 | Eller | 192/150 |
| 4,245,526 | 1/1981 | Fruin et al. | 192/150 |
| 4,478,320 | 10/1984 | Baba | 192/150 |

FOREIGN PATENT DOCUMENTS 3105841 10/1982 Fed. Rep. of Germany.
2088442  6/1982 United Kingdom.

*Primary Examiner*—Rodney H. Bonck
*Attorney, Agent, or Firm*—Sughrue, Mion, Zinn, Macpeak and Seas

[57] ABSTRACT

A gearing unit has an input shaft coupled via a gear train and a clutch to an output shaft which can propel a drive chain for a mineral winning machine or plough. The clutch is released by hydraulic pressure and a load sensor operates a valve device to release the clutch should an excessive load occur. The response of the hydraulic system is optimised by using a special fast-switching valve device and by maintaining a certain pressure in a release chamber of the clutch by circulating pressure fluid through the valve device when the clutch connects the drive to the output shaft. This pressure is lower than that necessary to release the clutch and the valve device rapidly switches to increase the pressure should an overload occur.

5 Claims, 2 Drawing Figures

GEARING UNITS FOR USE WITH MINING EQUIPMENT

This is a continuation of application Ser. No. 563,487, filed Dec. 20, 1983 now abandoned.

BACKGROUND OF THE INVENTION

The present invention relates to a gearing unit particularly for use with mining equipment.

A known form of gearing unit employs a sensor which senses overloads and operates a clutch to disconnect the output shaft from the input shaft. German patent specification No. 3043237 (which has an equivalent GB No. 2088442) describes a drive or gearing unit of this type. In this known construction, a strain gauge incorporated in the gear train is used to provide a load signal which serves to operate the clutch. Where the output shaft is used to drive a plough chain the clutch must disengage the drive rapidly and reliably to ensure the chain does not break should overloading occur. Tests have shown that the response time is determined by the minimum distance of the plough to the chain wheel and the gearing unit, i.e. when the plough is at the end of its travel. With a normal displacement speed of 2-3 meters per second and a maximum elongation of the chain of 1.4% the necessarily quick response time cannot be achieved with known constructions.

A general object of the present invention is to provide an improved gearing unit.

SUMMARY OF THE INVENTION

A gearing unit constructed in accordance with the invention comprises an input shaft, an output shaft, gearing drivably interconnecting the input shaft to the output shaft and a clutch incorporated in the gearing. The clutch is released to disconnect the output shaft from the input shaft by admitting hydraulic pressure fluid to a chamber associated with the clutch. A switchable valve device serves to control the flow of pressure fluid to and from the chamber and ensures that the chamber is subjected to a pre-determined lower pressure when the clutch is operable to couple the shaft together. A load sensing means provides an electriclal signal proportional to the load transmitted through the gearing and this signal actuates the valve device on excess loading being sensed to cause the chamber to be subjected to a higher pressure to operate the clutch to disconnect the input and output shafts. The valve device is capable of switching from one state to another in a time not less than 20 milliseconds and preferably in less than 10 milliseconds. By subjecting the chamber to a pre-determined lower pressure, usually around 8-15 bars, and by using a valve device with a fast response time the gearing unit can reliably disconnect the drive to a plough chain driven by the output shaft in the event of sudden overloading. When the chamber is subjected to the lower pressure, fluid can circulate through the chamber and the valve device is designed to permit this. A throttle in the fluid flow path can establish the pre-determined lower pressure. To ensure a fast response it is desirable to connect the valve device directly to the chamber without using flexible conduits and the like. The pressure fluid flow during normal operation can also serve to cool the unit.

A spigot or the like containing fluid passages and mounting the valve device can fit into a recess at one end of the output shaft near the clutch. Bores in a carrier ring of the clutch and/or the shaft can convey pressure fluid from the spigot to the pressure chamber. The fluid flow paths are hermetically sealed but a bleed valve for ventillation of the hydraulic system can be provided on the unit.

The aforementioned load sensor can take the form of a detachable pin fitted in the gearing and having at least one strain gauge which is coupled electro-magnetically with a pick-up coil.

The invention may be understood more readily, and various other features of the invention may become apparent, from consideration of the following description.

BRIEF DESCRIPTION OF DRAWINGS

An embodiment of the invention will now be described, by way of example, with reference to the accompanying drawings, wherein.

DESCRIPTION OF PREFERRED EMBODIMENT

Figure 1:
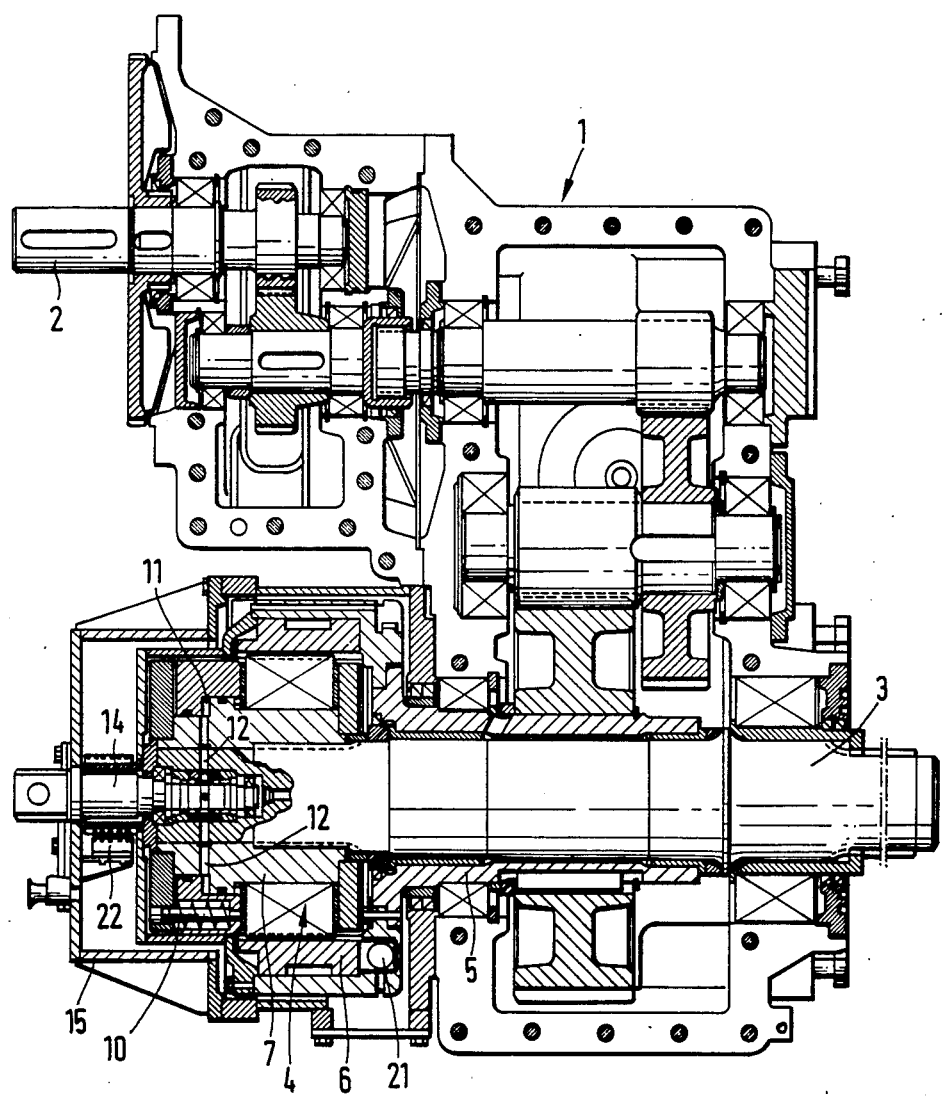
FIG. 1 is a schematic sectional side view of a gearing unit constructed in accordance with the invention.

As shown in FIG. 1, a gearing unit 1 takes the form of a housing containing an assembly with, inter alia, a gear train drivably interconnecting an input shaft 2 to an output shaft 3. The gear train is not specifically identified but may essentially comprise a series of meshing spur gears generally as shown. The unit 1 is particularly intended for use with chain-driven mining equipment, such as a winning machine or plough. In such cases the shaft 3 would drive a sprocket wheel for the chain and the shaft 2 would be coupled to a suitable drive motor. The unit 1 incorporates a clutch 4 which serves selectively to connect the shaft 3 to the gear train or to disconnect the shaft 3 from the gear train. The clutch 4 takes the form of a multi-plate clutch with alternate disc or plates supported for rotation as by conventional keying on respective inner and outer carrier rings 7,6. The outer carrier ring 6 is connected via a sleeve 5 surrounding the shaft 3 to the gear train to form the drive member for the clutch 4 while the inner carrier ring 7 forming the driven member of the clutch 4 is rotatably locked to the shaft, for example, by splines or other keying means.

Figure 2:
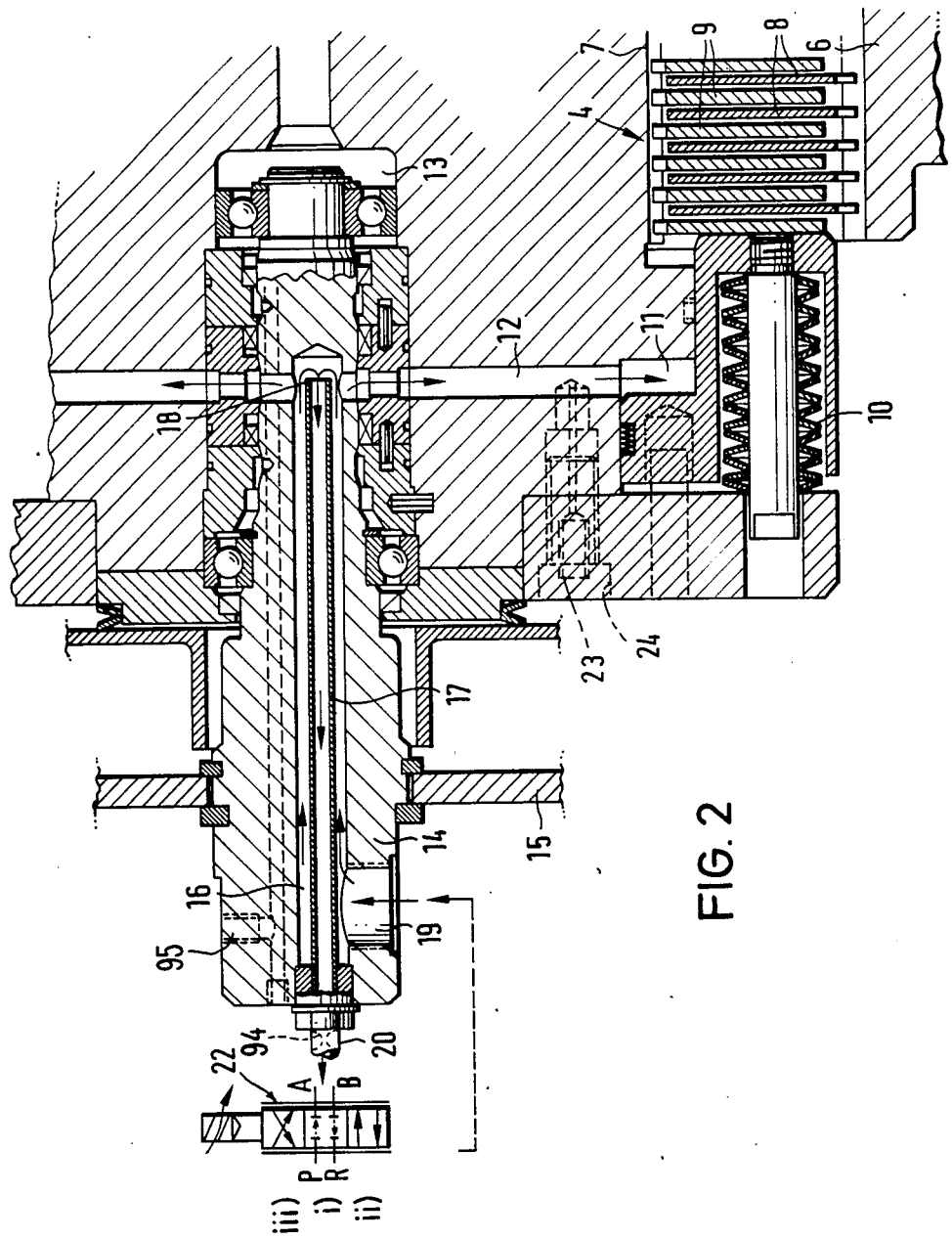
FIG. 2 is a diagrammtical representation of part of the gearing unit shown in FIG. 1 and taken on a somewhat larger scale.

As shown in FIG. 2, the clutch plates supported by the inner ring 7 are designated 9 and the clutch plates supported by the outer ring 6 are designated 8. As is known, the plates 8,9 are relatively displaceable axially of the shaft 3 and a spring device 10 incorporating a stack of spring discs urges the plates 8, 9 into face-to-face contact to ensure a driving connection between the shafts 3,2. The clutch 4 can be released to disconnect the shafts 3,2 by hydraulic pressure opposing the action of the spring device 10 thereby to separate the plates 8,9. To this end, an annular chamber 11 is established between a side face of the ring 7 and other components, e.g. blocks, of the assembly and, as shown in FIG. 1, seals are provided between these components and the ring 7. Hydraulic fluid is fed to the chamber 11 via bores 12 in the ring 7 and shaft 3. Hydraulic fluid charged into the chamber 11 reacts against the ring 7 to urge a carrier of the spring device 11 away from the ring 7 thereby to compress the stack of springs of the device 10. A stationary spigot member 14 fixed to a closure plate 15 of the housing of the unit 1 projects into a recess 13 in the shaft 3 and serves to convey pressure fluid to and from the chamber 11 via the bores 12. The spigot member 14 has an axial bore or channel 16 containing a pipe 17. The pipe 17 has an inner end 18 spaced from the inner end of the channel 16 and is radially spaced from the inner surface of the channel 16 to form an elongate gap 95. The bores 12 lead inner end of the channel 16. A further radial passage or recess 19 in the spigot member 14 forming a connector leads to the gap 95. The pipe 17 is likewise provided with an external connector 20. Conveniently, the 17 is fitted to the connector 20 via a screw-threaded connection. The connectors 19, 20 permit pressure fluid to be conveyed to and from the gap 95 and the pipe 17, respectively. The passage of pressure fluid serves additionally to cool the unit 1.

The connectors 19, 20 are connected to respective ports A, B of a valve device 22. The valve device 22 has ports P, R connected to a pressure fluid feed line (P) and to a pressure fluid return line (R), respectively. The valve device 22 can adopt one of three operating states represented schematically in FIG. 2 as: (i) a central neutral position with the ports A, B connected to the ports P, R but only allowing a low flow of fluid through the valve device 22 (ii) a lower position; with the ports A,B connected to the ports P, R and allowing a higher quantity of fluid of flow through the valve device 22; and (iii) an upper position with the ports A, B connected with the ports R, P respectively. The connector 20 incorporates a throttle 94 operative to restrict fluid flow from the pipe 17 through the valve device 22 and back to the return line. Thus, in one operative mode with the valve device 22 adopts the neutral position (i) and fluid circulates at a low flow rate continuously from the pressure line P through the valve device 22, the connector 19, gap 95, the bores 12 and the chamber 11 and back through the pipe 17 and the throttle 94 of the connector 20 and the valve device 22 to the return line R. This flow is the same direction as indicated by the arrows in FIG. 2. The throttle 94 ensures that there is a pressure of about 8–15 bars in the chamber 11 and this is below the threshold level necessary to overcome the force of the spring device 10. Consequentially although fluid pressure is present, the clutch 4 couples the shafts 3, 2 together. By causing the valve device 22 to adopt the state shown at the bottom of the representation of the valve device 22 in FIG. 2 (position ii), the flow is increased and the trottle 94 causes the pressure in the chamber 11 to increase above the threshold level to overcome the force of the spring device 10 and thereby disengage the drive from the output shaft 3 which is the condition depicted in FIG. 2. The other position (iii) of the valve device 22 is used if it is desired to relieve the pressure in the system.

The valve device 22 is a servo-hydraulic valve actuated electro-magnetically and is of a special fast-switching type which change state in a time not more than 20 milliseconds and preferably less than 10 milliseconds. Suitable valve devices are types 0062 and D631 supplied by Moog GmbH 7030, Böblingen, Federal Republic of Germany. In order to further optimize the response time, the valve device 22 is fitted to the spigot member 14 to avoid lengths of conduit or tubing and the chamber 11 and bore 12 are ventilated by means of a bleed valve 23 mounted in a screw 24 leading into one of the bores 12.

The valve device 22 is operated automatically from positions (i) and (ii) in dependence on the signal from a load sensor. This sensor includes a detachable pin 21 fitted into the gear train and as depicted the pin 21 is incorporated in the coupling between the sleeve 5 and the ring 6. The pin 21 incorporates at least one strain gauge which is stressed in accordance with the elastic deformation of the pin 21. A non-contacting pick-up, such as an inductive coil, provides an electrical signal derived from the strain gauge and varying according to the dynamic load experienced by the pin 21. An electronic control device (not shown) of know type receives the signal from the pick-up and provides a contro signal for controlling the operation of the valve device 22. The control device is arranged to change the state of the valve device 22 rapidly should an overload occur to release the clutch 4 and disengage the drive as described. Especially where the gearing unit 1 is used to propel the drive chain of a plough the control device is preferably adapted to cause the device 22 to cycle thereby to engage and dis-engage the clutch 4 repetitively. This ensures that the drive chain is not suddenly slackened. This control sequence can make the clutch plates 9, 8 slip as is known to gradually dissipate the tension in the drive chain until it is safe to hold the clutch 4 in the fully released condition.

We claim:
1. A gearing unit comprising:
   (a) an input shaft;
   (b) an output shaft;
   (c) gearing for drivably interconnecting the input shaft to the output shaft;
   (d) a releasable clutch incorporated in the gearing and normally interconnecting said input shaft to said output shaft;
   (e) said clutch including a chamber for receiving pressure fluid for releasing said clutch;
   (f) a hollow, fixed spigot means projecting into one of said shafts adjacent said chamber and including means defining separate fluid flow paths leading to and from said chamber;
   (g) a rapid acting electromagnetic switchable valve device operatively coupled to said spigot means in close vicinity to said chamber and operable to cause pressure fluid to circulate to and from said chamber via said fluid flow paths;
   (h) means responsive to switching of said valve device to a first state for creating an initial pre-determined lower circulating pressure fluid flow to the release chamber when the clutch is operating to couple said input shaft to said output shaft via said pressure fluid flow paths to insure that a pre-determined lower pressure prevails within said chamber;
   (i) a load sensor which provides an electrical signal depending on the load transmitted through the gearing; and
   (j) means for actuating the valve device to shift said valve device to a second state in response to said signal in event of excessive loading to cause said circulating pressure fluid flow to increase in pressure and said chamber to be exposed to a higher threshold pressure to release said clutch and disconnect said output shaft from said input shaft and to cause said clutch release to occur in a time not more than 25 milliseconds.

2. A gearing unit according to claim 1, wherein a throttle is provided in at least one of the pressure fluid flow paths to define the pre-determined lower pressure.

3. A gearing unit according to claim 2, wherein the spigot means has an axial channel containing a pipe of smaller diameter than that of said axial channel, one of said flow paths being defined by the inside of the pipe, and the other between said pipe and said axial channel, said gear unit comprises an inner carrier ring, and wherein bores in said inner carrier ring connect the flow paths to the chamber.

4. A gearing unit according to claim 1, wherein a ventilation device communicates with one of the pressure fluid flow paths.

5. A gearing unit according to claim 1, wherein said sensor includes at least one strain gauge mounted on a detachable pin in said gearing.

* * * * *